Dec. 9, 1930.          H. L. TANNER          1,784,504
VARIABLE SPEED CONTROL DEVICE
Filed May 5, 1926    2 Sheets-Sheet 2
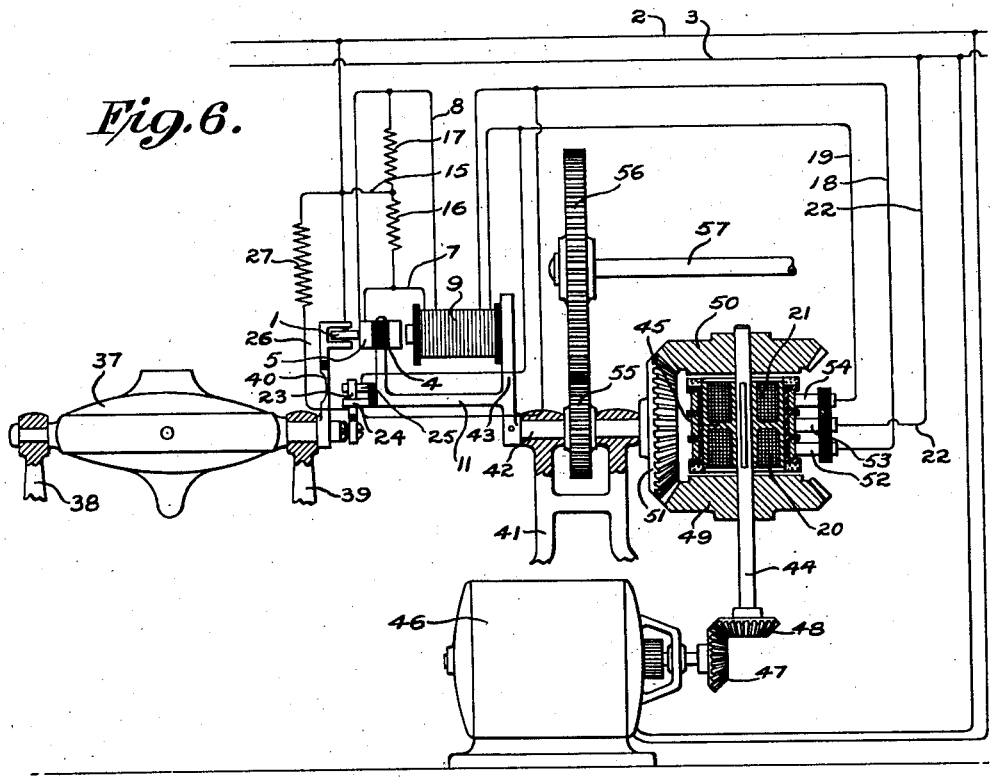
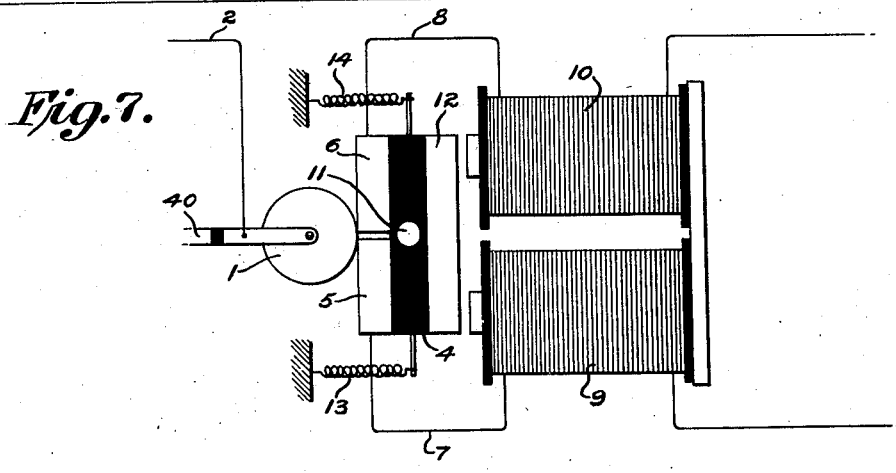
INVENTOR
BY *Harry L. Tanner*
*Moakley and Gill*
ATTORNEYS Patented Dec. 9, 1930

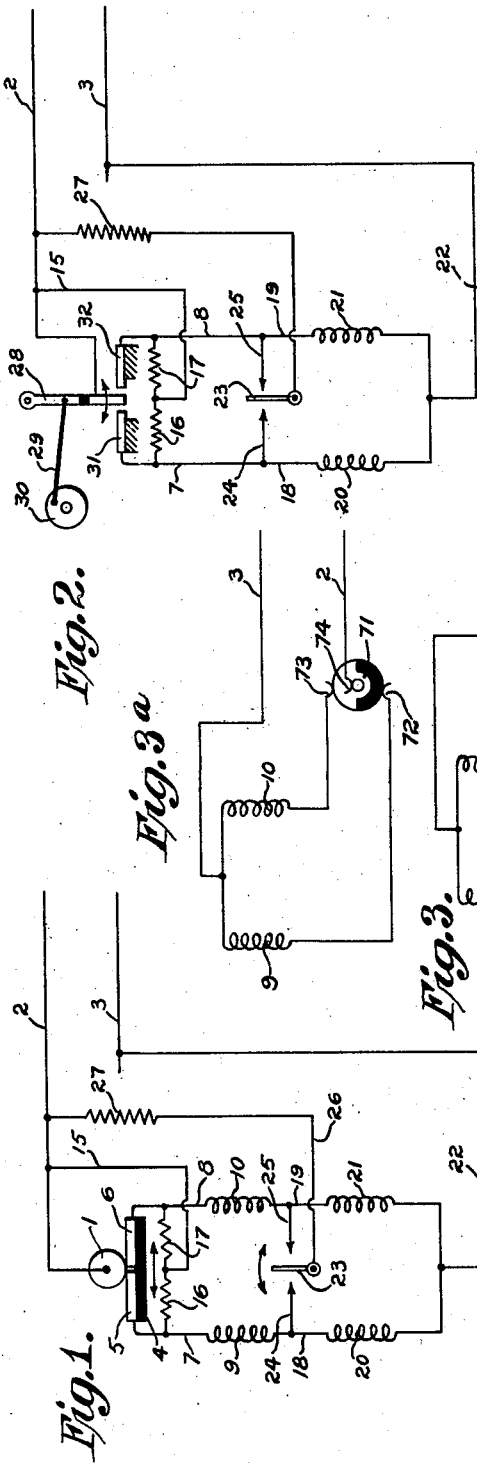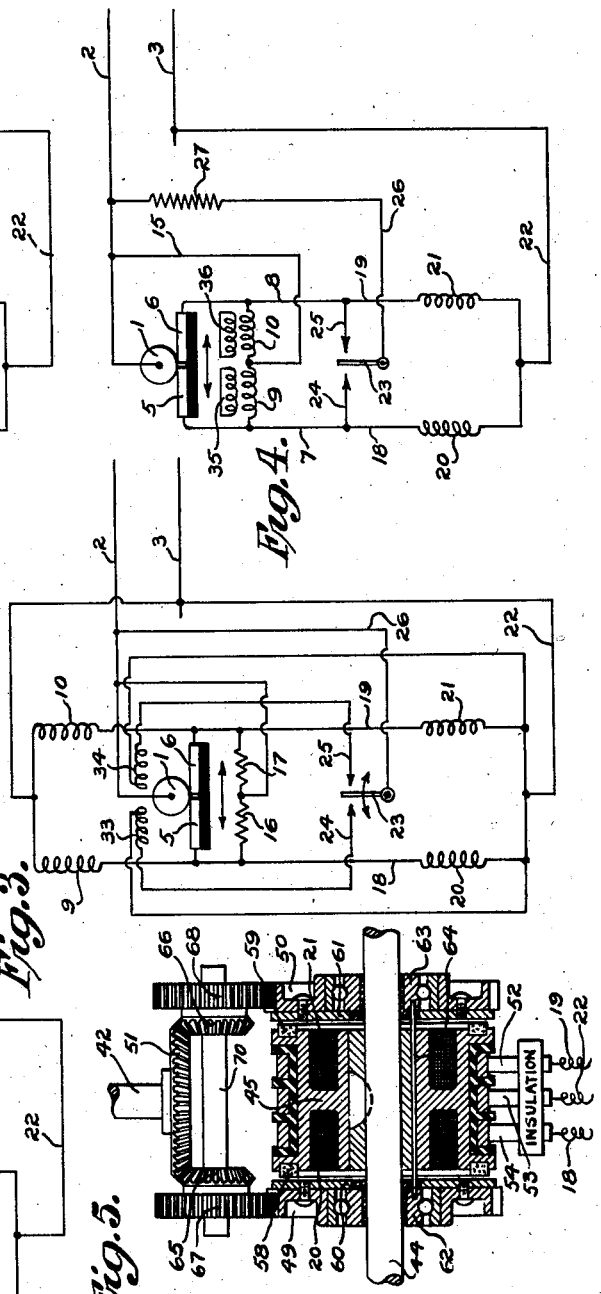

1,784,504

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

VARIABLE-SPEED CONTROL DEVICE

Application filed May 5, 1926. Serial No. 106,917.

This invention relates to variable speed control devices and particularly to devices for effecting the variable speed control of clutches, servo-motors and the like.

Heretofore, such mechanisms as are commonly known as follow-up mechanisms, servo-motors and the like, have been inefficient, inaccurate, jerky, and undependable in operation, tended to hunt and overrun frequently, and required periodic supervision and adjustment. By this invention the aforementioned objectionable features are eliminated, and a smooth-acting, anti-hunting follow-up mechanism is provided, whereby power clutches, servo-motors, or other power transmitting devices may be efficiently controlled according to the variable speed input motion.

The principal object of this invention is to provide a variable speed control mechanism which is smooth-acting, reliable and simple in operation, and effective and efficient for readily following and transmitting variable speed motion, and for amplifying the power input thereof to any desired degree.

Another object of this invention is to provide a follow-up mechanism or servo-motor having relatively movable primary and secondary elements, to a member of one of which is imparted a vibratory or oscillatory motion other than the relative movements between the elements, which vibratory motion with extreme rapidity intermittently effects the variable energization and consequently varying pressure of a power clutch to move the secondary element to follow the movements of the primary element. The vibrating member thus controls the clutch, servo-motor, or the like, by rapidly varying the energization thereof proportionally to the movements of the primary element. Inasmuch as the members controlling both forward and reverse directions of movement are energized by the vibratory make-and-break action but for varying lengths of time depending upon the direction of movement of the primary, the secondary element is capable of instantaneous and minutely variable movement so that a smooth positive following motion of the secondary element results.

Other objects and advantages of this invention will become apparent from the following description of a preferred embodiment of the invention as illustrated by the accompanying drawings in which like reference characters designate like parts in the several views.

In the drawings, Figs. 1, 2, 3 and 4 are schematic illustrations of various modifications of the electrical circuit which may be used and including primary and secondary motive elements, one of which is vibratory, and an electro-magnetic clutch actuated according to such motion;

Fig. 3—a is supplementary to Fig. 3, and shows a modification of the vibrator mechanism illustrated in Fig. 3;

Fig. 5 is a cross-section of the electro-magnetic clutch of special design preferably utilized;

Fig. 6 is a view of a preferred embodiment of the invention as it may be associated with a gyroscope to transmit the movement thereof; and Fig. 7 is an enlarged view of a means for imparting vibratory movement to one of the elements of the device.

Referring particularly to Fig. 1, numeral 1 designates a contact trolley or roller of conducting material and which is connected to one side 2 of the electrical supply line, the other side of which is designated 3. Contact roller 1 represents the primary or followed element of the system, the movements of which are adapted to be followed by the secondary or following element, and which may be represented by commutator 4 consisting essentially of spaced contacts 5 and 6 mounted upon a block of insulating material. A pair of leads 7 and 8 are attached to contacts 5 and 6, respectively, and to magnetic vibrator coils 9 and 10, respectively, whereby a lateral reciprocatory or vibratory motion is imparted to member 4 as roller 1 engages either one of contacts 5 or 6 and thus alternately energizes magnet coils 9 and 10, respectively. This is more clearly illustrated by Fig. 7 in which commutator 4 is shown to be pivotally mounted at 11 and carries an armature 12 which is attracted to either magnet coil 9 or 10 according to whether roller 1 engages either one of contacts 5 or 6, respectively. It will be seen that when coil 9, for example, is energized by engagement of roller 1 with contact 5, armature 12 will be drawn toward coil 9, thereby causing roller 1 to engage contact 6 to energize coil 10. This alternate energization of coils 9 and 10 is continuous whereby a vibratory motion is imparted to commutator 4, so that the resultant effect produced is a rapid relative movement between the respective contacts of the primary and secondary elements of the system. Centralizing springs 13 and 14 are attached to either side of commutator 4, as shown in Fig. 7, in order to alter the period of vibration thereof.

Connected across leads 7 and 8 and to side 2 of the electrical supply line by lead 15 are a pair of resistances 16 and 17 which are adapted to balance conductors 5 and 6, respectively, so that there will be no sparking as roller 1 moves between contacts 5 and 6. Resistances 5 and 6 have an additional utility which will be explained hereinafter.

Connected to vibrator coils 9 and 10 by means of leads 18 and 19 are the opposite coils 20 and 21, respectively, of the electromagnetic clutch which is preferably of the type illustrated in Fig. 5. The terminals of clutch coils 20 and 21 are connected by lead 22 to the other side 3 of the electrical supply line. The clutch, being power driven, actuates the secondary element in accordance with the movements of the primary element, inasmuch as the clutch is intermittently energized so that it imparts a series of pressure impulses of a varying degree with extreme rapidity to the secondary element, which produce the effect of a constant and smooth following motion. Moreover, such rapid energization and variable pressure of the clutch imparts great sensitivity to the mechanism and a corresponding accuracy results. It is obvious that a servo-motor or like apparatus may be substituted for the clutch and controlled by the vibrating commutator in the same manner.

If a hunting tendency between the primary and secondary elements of the system develops, contact lever 23, which moves with the primary element of the system, inasmuch as it is frictionally connected thereto, engages either one of contacts 24 or 25, which are mounted on the secondary element and are connected to leads 18 and 19, respectively. Inasmuch as contact lever 23 is connected to side 2 of the electrical supply line by lead 26 through resistance 27, which is equivalent to the resistance of the circuit above leads 18 and 19, a short circuit is established between line 2 through resistance 27, lead 26, lever 23 and either contact 24 or 25 to either clutch coil 20 or 21, respectively. Accordingly, if a secondary element carrying commutator 4, tends to hunt or overrun to either one side or the other, another circuit is established through the clutch coil on the same side to increase the clutching effect or pressure, whereupon the secondary member is actuated to decrease the time of return of roller 1 back to its central position. Accordingly, mechanical damping is effected in the clutch and hunting is prevented as well as overrunning, inasmuch as the reversal takes place 90° out of phase with the movement of roller 1, that is, when roller 1 is halfway in its path to one side of its central position.

Resistances 16 and 17 are preferably so designed that clutch coils 20 and 21 are never completely de-energized, but that there is a continual leakage through lead 15 and through resistances 16 and 17 when there is no relative movement between the primary and secondary elements, nor is one side of the clutch completely de-energized when the other side is energized and drawing the secondary element to follow the movements of the primary element. The purpose being that any sudden energization or reversal in the energization from one side of the clutch to the other side is immediately transmitted to the driven parts without the delay commonly occasioned by the inertia of the moving parts. Such alternating energization, however, is insufficient to cause any appreciable frictional resistance or dragging in the clutch when it is driving the secondary element, since the virtually continuous hunting of the clutch is too rapid for the immediate response of the secondary element, which accordingly always moves smoothly and positively.

Referring now to Fig. 2, a modification of the device shown in Fig. 1 is illustrated, the modification being in that the roller 1 of Fig. 1 is replaced by an oscillating contact lever 28 which is mechanically oscillated by rod 29 eccentrically mounted by one end to a constantly rotating disc 30, instead of the electrical oscillation effected in Fig. 1, lever 28 being connected to one side 2 of the electrical supply line. Lever 28 periodically makes and breaks the circuit with stationary contacts 31 and 32 of the secondary element of the system and which are the equivalents of contacts 5 and 6 of Fig. 1. The remainder of the circuit is like that of Fig. 1 with the exception of vibrator coils 9 and 10, which are not necessary since mechanical instead of electrical vibration is resorted to.

Fig. 3 illustrates another modification of the device shown in Fig. 1 wherein the modification consists of a different damping means whereby the damping is effected magnetically in the primary element rather than mechanically by the clutch as heretofore described. All other elements are identical with those shown in Fig. 1, the exception being that a pair of coils 33 and 34 are mounted upon each side of roller 1 and operate to magnetically dampen the movements thereof. For example, if a hunting tendency between the primary and secondary elements of the system develops, lever 23 will make contact with either contact 24 or 25, whereby either coil 33 or 34 is respectively energized to draw roller 1 back with a return movement taking considerably less time than its prior movement so that it breaks the circuit sooner than it normally would through one contact and makes contact with the other as lever 23 engages the other one of contacts 24 or 25 as the hunting member is carried beyond the mid-position. This time-controller damping continues until the hunting ceases.

Fig. 3—a is a modification of the vibrator mechanism shown in Fig. 3, in that a separate intermittent energization is applied to coils 9 and 10 which have been disconnected from contacts 5 and 6 to which they are shown connected in Fig. 3, and are directly connected to supply lines 2 and 3, a rotating commutator switch 71 being inserted in line 2. Commutator switch 71 consists of a disc having an insulated sector and its edge is engaged by a pair of brushes 72 and 73 which are connected to vibrator coils 9 and 10, respectively, whereby the latter are intermittently alternately energized as commutator 71 is revolved. The axis of commutator 71 is connected to line 2 by means of brush 74, and it may be rotated by the clutch driving means, if desired.

Fig. 4 illustrates another modification of the device shown in Fig. 1 wherein the resistance of vibrator coils 9 and 10 is utilized for preventing sparking between roller 1 and contacts 5 and 6, and in connection with the damper for the same purpose as and thus eliminating resistances 16 and 17. Windings 35 and 36 are preferably provided in coils 9 and 10, respectively, in order to further reduce the sparking, all other elements being identical with those shown in Fig. 1.

Fig. 6 illustrates a manner in which the system of this invention may be adapted to follow and transmit the movements or movement tendencies of a gyroscope without exerting any load thereon, so that it is free to exert its natural tendencies as effected by extraneous forces. Moreover, such movements are followed and are supplied with a greater power from an auxiliary source, so that the movements of the gyroscope or other like member may be utilized to indirectly effect the movements of large masses and exert large forces. The gyroscope 37 is suspended in a gimbal ring or rings in the usual manner, the outer ring being trunnioned in rigid standards 38 and 39, for example. One of the trunnions of the gyroscope carries an integral resilient crank arm 40, the end of which is bifurcated and carries the contact roller 1 which is connected to one side 2 of an electrical supply line and insulated from the remainder of arm 40 as shown. Thus the primary or followed element in this instance comprises the gyroscope 37, arm 40 and contact roller 1.

The secondary or following element of the system may be journalled in the rigid standard 41, and the shaft 42 thereof carries integral crank arm 43 upon which are mounted the vibrator magnets 9 and 10, assuming that the circuit and the arrangement of Fig. 1 is preferred. Crank arm 43 is provided with an integral parallel extension 11 which pivotally carries vibratory commutator 4, to which contact roller 1 may move relatively in the manner heretofore described. Contact lever 23 of the damping means is frictionally mounted upon the hub of crank arm 40 by means of a spring washer or the like, as shown, so that when the following element tends to hunt with respect to the movements of the gyroscope 37, lever 23 makes contact with either contact 24 or 25, since it can slip relatively to the movement of crank arm 40 upon which it is mounted, whereby a circuit is established to stop the hunting in the manner heretofore described.

The movement of roller 1 from its mid-position as shown in Figs. 1, 3, 4 and 7 to engage either contact 5 or 6, accordingly energizes the vibrator coils and the electro-magnetic clutch coils 20 or 21 which are mounted in a clutch ring 45 splined upon and adapted to continually rotate with shaft 44, which is driven by an electric motor 46, or other power source, through bevel gears 47 and 48. A pair of bevel gears 49 and 50 are freely mounted upon shaft 44 and mesh with a bevel gear 51 attached to shaft 42 of the secondary or following element of the system. Contact 5 is connected through lead 7, vibrator coil 9, lead 18, and brush 52 to the slip ring of coil 20 of the electro-magnetic clutch, and contact 6 is connected through lead 8, vibrator coil 10, lead 19 and brush 54 to the slip ring of coil 21, whereas brush 53 and its slip ring, which is common to both coils 20 and 21, is connected by lead 22 to the other side 3 of the electrical supply line. Accordingly, as the movements of the gyroscope as transmitted to roller 1 effect the energization of clutch coils 20 or 21 by closing the circuit through either one of contacts 5 or 6, respectively, the central clutch ring 45 grips either gear 49 or 50, respectively, and thereby drives the same, which motion is transmitted to shaft 42 and arm 43 to move commutator 4 bodily in the same direction that roller 1 has been moved. This motion is smooth and continuously follows the movements of the primary elements since the variable pressure in the clutch effects the movement as it is energized by the movement of the primary element. The follow-up movement of the secondary element of the system may be utilized to drive other means in synchronism with the movement of the gyroscope 37 by mounting a gear 55 upon shaft 42 which drives another gear 56 attached to an output shaft 57.

In order that the movement tendency of the gyroscope may be followed simultoneously and without hesitation, a specially designed electro-magnetic clutch is preferable, and may be of the type shown in Fig. 5. The clutch ring 45 is keyed to power driven shaft 44 so that it rotates therewith and is axially immovable. Clutch ring 45 is provided with magnetic coils 20 and 21 to which, through slip rings, are connected their respective brushes 18 and 19 and the common brush 22. Clutch ring 45 also carries a pair of friction rings 58 and 59 which are always in close proximity to friction discs 60 and 61 which are securely attached to gears 49 and 50, respectively. Gears 49 and 50 are freely rotatable on ball bearings, the respective inner races of 62 and 63 of which are securely attached to shaft 44 in the usual manner of mounting ball bearings. A slight axial motion between the gear units 49 and 50 and shaft 44 is provided for which is sufficient to allow gears 49 and 50 and their respective friction discs 60 and 61 to be drawn into frictional engagement with friction rings 58 and 59, respectively, as the electro-magnetic coils of the clutch are energized. A number of axially disposed pins 64 are slidably mounted in clutch ring 45 through friction discs 60 and 61, and their ends are embedded in or bear against the inner ball races 62 and 63 so that they have axial play. Accordingly, one disc is pushed away from its friction ring when the opposite disc is drawn to its friction ring due to the energization of one of the magnet coils, thus effecting a rapid clutching alternation from one side to another, or forward to reverse and vice versa. The forward and reverse drive of shaft 42 is effected through bevel gear 51 meshing with diametrically opposite bevel gears 65 and 66, which are integrally mounted with spur gears 67 and 68, respectively, upon a jack-shaft 70, so that spur gears 67 and 68 mesh with and are driven by gears 49 and 50, respectively, when the latter are clutched to rotating clutch ring 45.

In the manner hereinbefore described, each of the electro-magnetic coils is always at least slightly energized due to leakage in the electrical circuit, but such energization is not sufficient to offer resistance or dragging to the rotating clutch ring 45, but is intended to maintain each one of friction discs 60 and 61 in intimate proximity to their respective friction rings 58 and 59, so that there may be no delay between the time of energization and clutching, and thus a smooth motion of the follower is obtained since the pressure of the clutch varies as the degree of energization. For the same reason the masses of the moving clutching parts, namely discs 60 and 61 and gears 49 and 50, are preferably as small as possible so that their inertia is negligible.

If the gyroscope 37 should suddenly reverse its direction of movement and turn in the opposite direction, roller 1 will move to engage the opposite contact, such as contact 6 for example, and the circuit will be made primarily through lead 8, vibrator coil 10, lead 19, clutch coil 21 and lead 22 to the other side 3 of electrical supply line, but the vibrator will continuously operate to control the clutch as long as the movement of the gyroscope continues. The energization of clutch coil 21, probably augmented an instant later by the circuit established between lever 23 and contact 25 due to the overrunning tendency of the sudden reversal, clutches disc 61 to friction ring 59, and the direction of rotation of shaft 42 is reversed through gears 50, 68, 66 and 51. Inasmuch as motor 46 is driving clutch ring 45 at constant speed, and as the speed of the primary element usually varies periodically, there is necessarily some slippage between clutch ring 45 and friction discs 60 and 61 so that the actual primary input speed may be reproduced accurately. It is obvious that a larger motor or power source may be utilized whereby a greater power and a larger torque may be supplied to the following motion.

While only one step in the operation of the system in both directions has been described in detail, it is evident that the successive steps are instantaneous and continuous as the primary element moves, and also that, while a preferred embodiment of this invention has been illustrated and described, it is to be understood that modifications in design and detail may be freely made and that other forms of apparatus may be likewise controlled without departing from the spirit of this invention within the scope of the appended claims.

I claim:

1. In a follow-up mechanism the combination of a bodily movable contact having vibratory movement distinct from its bodily displacement, a bodily movable contact associated therewith, said contacts adapted to be movable relatively to each other, and means actuated by one of said contacts for causing one of them to follow the movement of the other.

2. In a follow-up mechanism, the combination of relatively movable primary and secondary elements, normally engaging contacts associated with said elements, means for vibrating one of said contacts relatively to said elements, and means controlled by said vibrating means for moving said secondary element in accordance with the movements of said primary element.

3. In a follow-up mechanism, the combination with relatively movable followed and following elements, of a contact associated with one of said elements and vibratory with respect to said element, a normally relatively stationary contact associated with said other element and engaging said first named contact, means controlled by said followed element for vibrating said first-named contact, and means controlled by said first-named contact for moving said following element only in accordance with the movements of said followed element.

4. In a variable speed control device, a pair of relatively and bodily movable contacts, means for moving one of said contacts, means energized by said movement for vibrating said other contact, and power means actuated by said vibrating contact for moving the same to follow the movements of said moving contact.

5. In a variable speed control device, the combination of a pair of relatively movable engaging contacts, means for vibrating one of said contacts actuated by relative movement between said contacts, and means controlled by said vibrating contact for maintaining said contacts in juxtaposition irrespective of their several bodily movements.

6. In a variable speed control device, the combination of an electromagnetic power member, and means for controlling said member, said means comprising relatively movable contacts, means actuated by relative movement between said contacts for vibrating one of said contacts, and means whereby the vibrating contact energizes said member to follow the bodily movement of one of said contacts.

7. A speed control device comprising in combination, a followed member, a following member engaging said followed member, means for vibrating one of said members and controlled by the relative positions of said members, and means controlled by said vibrating member for driving said following member in accordance with the movement of said followed member.

8. In mechanism of the character described, relatively movable primary and secondary elements, normally engaging contacts associated with each of said elements, means controlled by the movement of said primary element relatively to said secondary element for oscillating one of said contacts, and means controlled by said oscillating contact for moving said secondary element to follow said primary element.

9. In a servo-motor mechanism, the combination of a primary element, a secondary element associated therewith, means for vibrating one of said elements, said means actuated by relative movement between said elements, and mechanism energized by the vibrating element for causing the secondary element to follow the movements of the primary element.

10. In a servo-motor mechanism, the combination of a primary element, an electrical contact associated therewith, a secondary element, a commutator associated therewith and engaging said contact, means for vibrating said commutator upon relative movement between said contact and said commutator, and an electromagnetic clutch energized by the vibrations of said commutator for moving said secondary element to follow said primary element.

11. In a servo-motor mechanism, the combination of a followed member, a vibrating follower member associated therewith, a support for said follower, means energized by relative movement between said members to vibrate said follower for continuously making and breaking an electrical circuit between them, an electromagnetic clutch and means whereby said clutch maintains said support substantially fixed with respect to said followed member according to the circuit make and break between said members.

12. In a servo-motor mechanism, the combination of primary and secondary elements, a contact associated with the primary element, a commutator engaging said contact and associated with the secondary element, means for making and breaking the electrical circuit between said contact and commutator, said means being energized by relative motion between them, an electro-magnetic clutch intermittently energized by the make and break of the circuit, and means actuated by said clutch for maintaining the secondary element substantially fixed with respect to the primary element.

13. In a clutch control mechanism, the combination of primary and secondary elements subject to hunting, a clutch for driving said secondary element, means to control said clutch, and an auxiliary control mechanism for said clutch actuable to prevent hunting.

14. In a variable speed control mechanism, the combination of relatively movable elements subject to excessive oscillation, mechanism for causing one element to follow the movement of the other element, and an auxiliary controlling device actuated by excessive relative movement between said elements for modifying the operation of mechanism to dampen the oscillations.

15. In a variable speed control mechanism, the combination of relatively movable elements subject to hunting, mechanism controlled by the relative movement between said elements for keeping them in juxtaposition, and an auxiliary controlling device operated by the movement of said elements for actuating said mechanism to prevent the hunting.

16. In a variable speed control device having primary and secondary elements subject to hunting, mechanism actuated by the movement between said elements for driving said secondary element, and an auxiliary controlling device actuated by the movement between the elements for controlling said mechanism to prevent the hunting.

17. In a follow-up mechanism, the combination with relatively movable followed and following elements, of a relatively vibrated contact associated with one of said elements, a normally relatively stationary contact associated with said other element and engaging said first-named contact, means for vibrating said first-named contact, and means controlled by said first-named contact for moving said following element in accordance with the movements of said followed element.

18. In a follow-up mechanism, a pair of relatively fixed contacts, a single contact cooperating electrically therewith, means for causing continuous oscillatory relative displacement between the pair of contacts and the single contact, a controlling element, means controlled thereby for relatively displacing the pair of contacts and the single contact, a follow-up power element, means controlled by the contacts for operating the power element to restore the pair of contacts and the single contact to their normal relation.

In testimony whereof I affix my signature.

HARRY L. TANNER.